(12) United States Patent
Stacy

(10) Patent No.: US 12,319,250 B2
(45) Date of Patent: Jun. 3, 2025

(54) BRAKE SYSTEMS, VEHICLES INCLUDING SUCH SYSTEMS, METHODS OF OPERATING SUCH SYSTEMS, AND METHODS OF INSTALLING SUCH SYSTEMS

(71) Applicant: Lance A. Stacy, Crown Point, IN (US)

(72) Inventor: Lance A. Stacy, Crown Point, IN (US)

(*) Notice: Subject to any disclaimer, the term of this patent is extended or adjusted under 35 U.S.C. 154(b) by 133 days.

(21) Appl. No.: 17/550,047

(22) Filed: Dec. 14, 2021

(65) Prior Publication Data

US 2022/0355776 A1 Nov. 10, 2022

Related U.S. Application Data

(60) Provisional application No. 63/186,304, filed on May 10, 2021.

(51) Int. Cl.
*B60T 13/58* (2006.01)
*B60T 7/04* (2006.01)
(Continued)

(52) U.S. Cl.
CPC ........ *B60T 13/581* (2013.01); *F16D 65/0043* (2013.01); *B60T 7/04* (2013.01);
(Continued)

(58) Field of Classification Search
CPC ...... B60T 13/581; B60T 7/04; B60T 2270/10; B60T 13/686; F16D 65/0043;
(Continued)

(56) References Cited

U.S. PATENT DOCUMENTS 2,248,435 A * 7/1941 Pleines ................. B60T 13/581
188/106 R
3,093,213 A 6/1963 Limoges et al.
(Continued)

FOREIGN PATENT DOCUMENTS

EP 0211811 A1 2/1987

OTHER PUBLICATIONS

International Search Report and Written Opinion for International Application No. PCT/US2022/026372, dated Aug. 9, 2022, (12 pages).
(Continued)

*Primary Examiner* — Pamela Rodriguez
(74) *Attorney, Agent, or Firm* — Hartman Global IP Law; Gary M. Hartman; Domenica N. S. Hartman

(57) ABSTRACT

Brake systems, vehicles having such brake systems, and methods of operating and installing the brake systems on vehicles. Such a brake system operates one or more brakes to reduce the speed of the vehicle through the operation of a brake pedal. The system includes a hydraulic circuit functionally coupled to the one or more brakes and configured to apply a braking force with the brake(s) that is in relation to a change in pressure of hydraulic fluid within the hydraulic circuit, and an air circuit functionally coupling the brake pedal to the hydraulic circuit. The air circuit is configured to convert manual actuation of the brake pedal to a change in the pressure of the hydraulic fluid within the hydraulic circuit and thereby apply a braking force in relation to a degree of actuation of the brake pedal.

6 Claims, 3 Drawing Sheets

(51) Int. Cl.
  *F16D 51/24* (2006.01)
  *F16D 65/00* (2006.01)
  *F16D 65/22* (2006.01)
  *F16D 121/06* (2012.01)

(52) U.S. Cl.
  CPC .......... *B60T 2270/10* (2013.01); *F16D 51/24* (2013.01); *F16D 65/22* (2013.01); *F16D 2121/06* (2013.01)

(58) Field of Classification Search
  CPC ...... F16D 51/24; F16D 65/22; F16D 2121/06; F16D 2121/08
  See application file for complete search history.

(56) References Cited

U.S. PATENT DOCUMENTS

| | | | |
|---|---|---|---|
| 3,902,360 A * | 9/1975 | Cline | G01L 3/18 73/116.05 |
| 4,052,855 A * | 10/1977 | Prillinger | B60T 17/22 60/579 |
| 4,192,557 A * | 3/1980 | Leiber | B60T 8/46 303/114.3 |
| 4,623,032 A | 11/1986 | Kemmer | |
| 4,899,642 A * | 2/1990 | Hwang | B60T 13/581 91/1 |
| 5,361,644 A | 11/1994 | Nedele et al. | |
| 5,794,739 A * | 8/1998 | Ring | B60T 13/583 188/153 R |
| 5,938,710 A | 8/1999 | Lanza et al. | |
| 6,241,453 B1 | 6/2001 | Upmeyer | |
| 6,859,697 B2 | 2/2005 | Muragishi | |
| 7,688,223 B2 | 3/2010 | Magens et al. | |
| 7,699,141 B2 | 4/2010 | Fossier et al. | |
| 7,761,210 B2 | 7/2010 | Baginski et al. | |
| 9,145,286 B2 | 9/2015 | Pfaff et al. | |
| 9,828,223 B2 | 11/2017 | Svensson et al. | |
| 10,346,797 B2 | 7/2019 | Jacobus et al. | |
| 10,538,421 B2 | 1/2020 | Blevins et al. | |
| 10,941,026 B2 | 3/2021 | Wirth et al. | |
| 2007/0198157 A1 | 8/2007 | Righi | |
| 2012/0253625 A1 | 10/2012 | Canuto et al. | |
| 2013/0236285 A1 | 9/2013 | Maurissen et al. | |
| 2015/0225218 A1 | 8/2015 | Strand | |
| 2016/0090283 A1 | 3/2016 | Svensson et al. | |
| 2017/0297879 A1 | 10/2017 | Franzen | |
| 2017/0313290 A1 | 11/2017 | Finkl et al. | |
| 2018/0058525 A1 | 3/2018 | Kasper et al. | |
| 2019/0220005 A1 | 7/2019 | Flottran et al. | |
| 2019/0243353 A1 | 8/2019 | Daimer et al. | |
| 2019/0270449 A1 | 9/2019 | Grabbe et al. | |
| 2019/0351890 A1 | 11/2019 | Mennie | |
| 2020/0039353 A1 | 2/2020 | Chandrasekar | |
| 2020/0122989 A1 | 4/2020 | Nunes Espirito Santo | |
| 2020/0133265 A1 | 4/2020 | Modolo | |
| 2020/0174479 A1 | 6/2020 | Howey | |
| 2020/0247651 A1 | 8/2020 | Wang et al. | |
| 2020/0247652 A1 | 8/2020 | Okamoto et al. | |
| 2020/0299117 A1 | 9/2020 | Sperlich et al. | |
| 2021/0035056 A1 | 2/2021 | Jacobus et al. | |

OTHER PUBLICATIONS

Notice of Preliminary Rejection for Korean Patent Application No. 2023-7042044, 28 pages, (English & Korean Language).

* cited by examiner

BRAKE SYSTEMS, VEHICLES INCLUDING SUCH SYSTEMS, METHODS OF OPERATING SUCH SYSTEMS, AND METHODS OF INSTALLING SUCH SYSTEMS

CROSS-REFERENCE TO RELATED APPLICATIONS

This application claims the benefit of U.S. Provisional Application No. 63/186,304 filed May 10, 2021, the contents of which are incorporated herein by reference.

BACKGROUND OF THE INVENTION

The present invention generally relates to vehicle brake systems. The invention particularly relates to brake systems that include both air brake system elements and hydraulic brake system elements.

Relatively large vehicles such as buses and semi-tractor-trailer have widely used compressed air for brake actuation and safety response. In the example of semi-tractor-trailers, which typically comprise a tractor and a semi-trailer coupled thereto with a hitch (for example, a fifth-wheel), current air brake systems involve a standardized connection of supply and control air between the tractor and the semi-trailer to enable an operator located in the tractor to supply a braking force to the semi-trailer.

An example of certain components of a conventional air brake system is represented in FIG. 1. The components define a simple service brake associated with a single wheel or axle of a vehicle (for example, a semi-trailer). FIG. 1 represents a drum brake 12 configured to reduce a rotational speed of an axle 10 associated with the brake 12. The drum brake 12 is functionally coupled to a service brake chamber 14 via a mechanical linkage that includes a pushrod 22 and a slack adjuster 24. The drum brake 12 includes an S-cam 26 situated between a pair of brake shoes 28 and mounted for rotation about an axis 27 thereof, a roller 32 mounted to each individual brake shoe 28 so as to be engageable with the S-cam 26, and a brake lining or pad 30 mounted to each individual brake shoe 28 so as to face a drum liner 36 of a drum 34. The S-scam 26 is represented in FIG. 1 in a seated or released position, in which the rollers 32 of the brake shoes 28 (in the nonlimiting example of FIG. 1) are not engaged by camming surfaces 26A of the S-cam 26. The brake chamber 14 includes a diaphragm 18, a push plate 21, the pushrod 22, and a return spring 20. The diaphragm 18 separates an internal cavity of the brake chamber 14 into an air chamber 16 and a spring chamber 17. The return spring 20 is configured to bias the diaphragm 18 toward the air chamber 16.

During operation of the vehicle, a brake pedal (for example, a foot control valve) may be utilized to apply (actuate) a braking action with the drum brake 12 as desired. When the brake pedal is applied, air pressure within the air chamber 16 can be sufficiently increased to overcome the return spring 20 and move the diaphragm 18 toward the spring chamber 17. This movement simultaneously results in movement of the pushrod 22 (to the right as viewed in FIG. 1), the movement of which is translated via the slack adjuster 24 to the S-cam 26, causing the S-cam 26 to rotate about its axis 27 (in a clockwise direction as viewed in FIG. 1) away from its seated or released position. Rotation of the S-cam 26 causes the camming surfaces 26A thereof to engage the rollers 32 of the brake shoes 28, causing the brake shoes 28 to be forced apart in generally radially outward directions such that the brake linings 30 contact the drum liner 36, inducing a braking action (force) between the brake linings 30 and drum liner 36 as a result of friction generated therebetween. The extent and force with which the brake linings 30 contact the drum liner 36 are related to the degree to which the brake pedal is applied (for example, compressed or pressed toward a floor of the vehicle). When the brake pedal is released, the air pressure in the air chamber 16 decreases, the S-cam 26 is rotated toward its seated or released position, the brake shoes 28 return inward, and the brake linings 30 disengage from the drum liner 36. For simplification of the disclosure, the vehicle and air brake system thereof are described without reference to a parking brake. However, such systems commonly include parking brakes configured to maintain the brakes engaged while the vehicle is parked.

Although current air brake systems, such as the system represented in FIG. 1, have proven robust, these systems may include certain shortcomings. For example, air brake systems depend on an adjustment of the linkage between the actuator (for example, the brake chamber 14) and the brake (for example, the drum brake 12) to maintain consistent braking force with respect to a brake signal (for example, air pressure changes in the air chamber 16). Also, the braking force applied may be identical regardless of a load on the semi-trailer. In some cases, the braking force applied by the brakes may exceed the traction of the tires with the surface they contact, particularly if the semi-trailer is supporting relatively light loads. This may result in the semi-trailer tires locking, which may cause flat spots and/or potentially lead to loss of control of the semi-trailer.

To address some of these limitations of air brake systems, air driven anti-lock brake systems (ABS) have been adapted to some semi-trailers. However, the inherent compressibility of air may introduce sufficient time lag in the system such that the net benefit of the ABS is reduced or limited. Therefore, it can be appreciated that there are certain problems, shortcomings or disadvantages associated with air brake systems, and that it would be desirable if systems and/or methods were available that were capable of at least partly overcoming or avoiding the problems, shortcomings or disadvantages noted above.

BRIEF DESCRIPTION OF THE INVENTION

The present invention provides vehicle brake systems, vehicles having such brake systems, methods of operating the brake systems, and methods of installing the brake systems on vehicles.

According to one aspect of the invention, a vehicle brake system is provided for operating one or more brakes of a vehicle that are configured to reduce the speed of the vehicle with a brake pedal of the vehicle. The system includes a hydraulic circuit functionally coupled to the one or more brakes and configured to apply a braking force with the brakes that is in relation to a change in a pressure of a hydraulic fluid within the hydraulic circuit, and a pressurized air circuit functionally coupling the brake pedal to the hydraulic circuit. The air circuit is configured to convert manual actuation of the brake pedal to a change in the pressure of the hydraulic fluid within the hydraulic circuit and thereby apply a braking force in relation to a degree of actuation of the brake pedal.

According to another aspect of the invention, a vehicle is provided that includes one or more brakes that are configured to reduce the speed of the vehicle, a brake pedal, a hydraulic circuit functionally coupled to the one or more brakes and configured to apply a braking force with the brakes that is in relation to a change in a pressure of a hydraulic fluid within the hydraulic circuit, and a pressurized air circuit functionally coupling the brake pedal to the hydraulic circuit. The air circuit is configured to convert manual actuation of the brake pedal to a change in the pressure of the hydraulic fluid within the hydraulic circuit and thereby apply a braking force in relation to a degree of actuation of the brake pedal.

According to another aspect of the invention, a method is provided for operating one or more brakes of a vehicle that are configured to reduce the speed of the vehicle. The method includes manually actuating a brake pedal of the vehicle, converting the degree of actuation of the brake pedal to an air pressure change within a pressurized air circuit of the vehicle, converting the air pressure change into a change in pressure of a hydraulic fluid within a hydraulic circuit of the vehicle, and applying a braking force with the one or more brakes as a result of the pressure change in the hydraulic fluid.

According to another aspect of the invention, a method is provided that includes providing a vehicle having a brake pedal, brakes configured to reduce the speed of the vehicle, and a pressurized air circuit configured for actuating the brakes in response to actuation of the brake pedal, installing a hydraulic circuit on the vehicle functionally between the pressurized air circuit and the brakes that is configured to actuate the brakes and apply a braking force therewith in response to a change in a pressure of a hydraulic fluid within the hydraulic circuit, and modifying the pressurized air circuit such that the air circuit is configured to convert actuation of the brake pedal to a change in the pressure of the hydraulic fluid within the hydraulic circuit and thereby apply a braking force in relation to a degree of actuation of the brake pedal.

Technical effects of vehicle brake systems, vehicles, and methods within the scope of what is described above preferably include the ability to hydraulically control the brakes of a vehicle that are conventionally controlled with pressurized air.

Other aspects and advantages of this invention will be appreciated from the following detailed description.

DETAILED DESCRIPTION OF THE INVENTION

Figure 1:
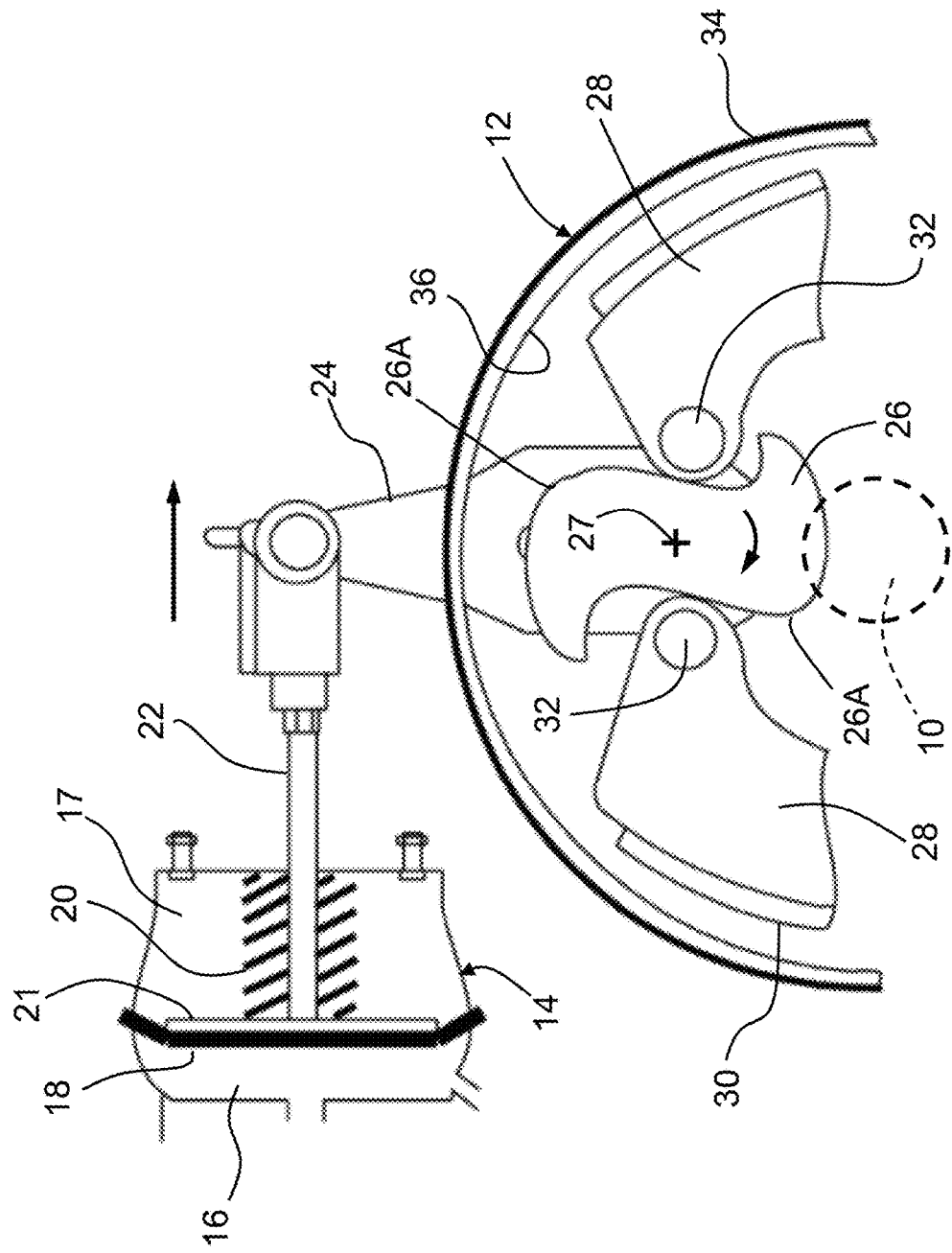
FIG. 1 represents certain components of a conventional air brake system.

Disclosed herein are brake systems that include both air brake system elements and hydraulic brake system elements and methods of operating the same. The brake systems and methods are believed to be particularly beneficial for use with relatively large vehicles such as trains, buses, and semi-tractor-trailer that commonly rely on air brake systems. Methods are also provided for converting existing air brake systems to the brake systems disclosed herein.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings. The following detailed description also identifies certain but not all alternatives of the embodiment(s) depicted in the drawings. Therefore, the appended claims, and not the detailed description, are intended to particularly point out subject matter regarded as the invention, including certain but not necessarily all of the aspects and alternatives described in the detailed description.

Figure 3:
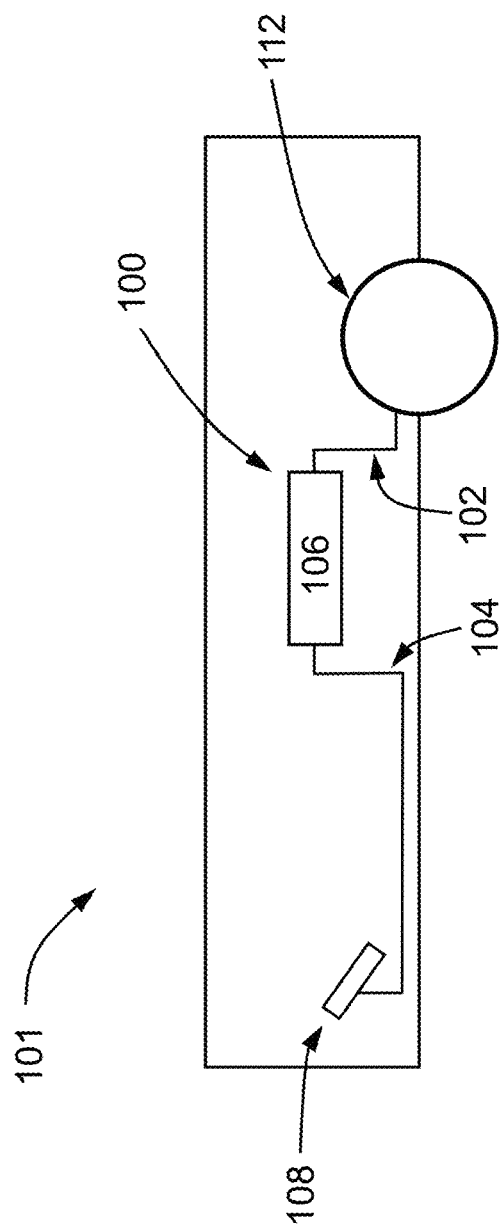
FIG. 3 schematically represents a vehicle in which the brake system of FIG. 2 is installed.

FIG. 3 schematically represents a nonlimiting example of a brake system 100 installed on a vehicle 101, which may be, as nonlimiting examples, a train, a bus, a semi-tractor-trailer, or a trailer (for example, a semi-trailer of a semi-tractor-trailer). The brake system 100 includes a hydraulic circuit 102 functionally coupled to at least one brake 112 of the vehicle 101. The hydraulic circuit 102 is configured to control the brake 112 and apply a braking force therewith in relation to a change in pressure of a hydraulic fluid within the hydraulic circuit 102. Such a relation is characterized by the braking force increasing with increasing hydraulic fluid pressure and decreasing with decreasing hydraulic fluid pressure. The brake system 100 further includes a pressurized air circuit 104 functionally coupled to a brake pedal 108 of the vehicle 101. The air circuit 104 is configured to convert manual actuation of the brake pedal 108 to a corresponding change in air pressure within the air circuit 104, which is then used to cause a change in the pressure of the hydraulic fluid within the hydraulic circuit 102. In this manner, a braking force may be applied with the brake 112 in relation to a degree of actuation of the brake pedal 108. FIG. 3 schematically represents the hydraulic and air circuits 102 and 104 as being interconnected through a transfer unit 106 which operates to convert changes in air pressure within the air circuit 104 to changes in pressure of the hydraulic fluid within the hydraulic circuit 102.

Figure 2:
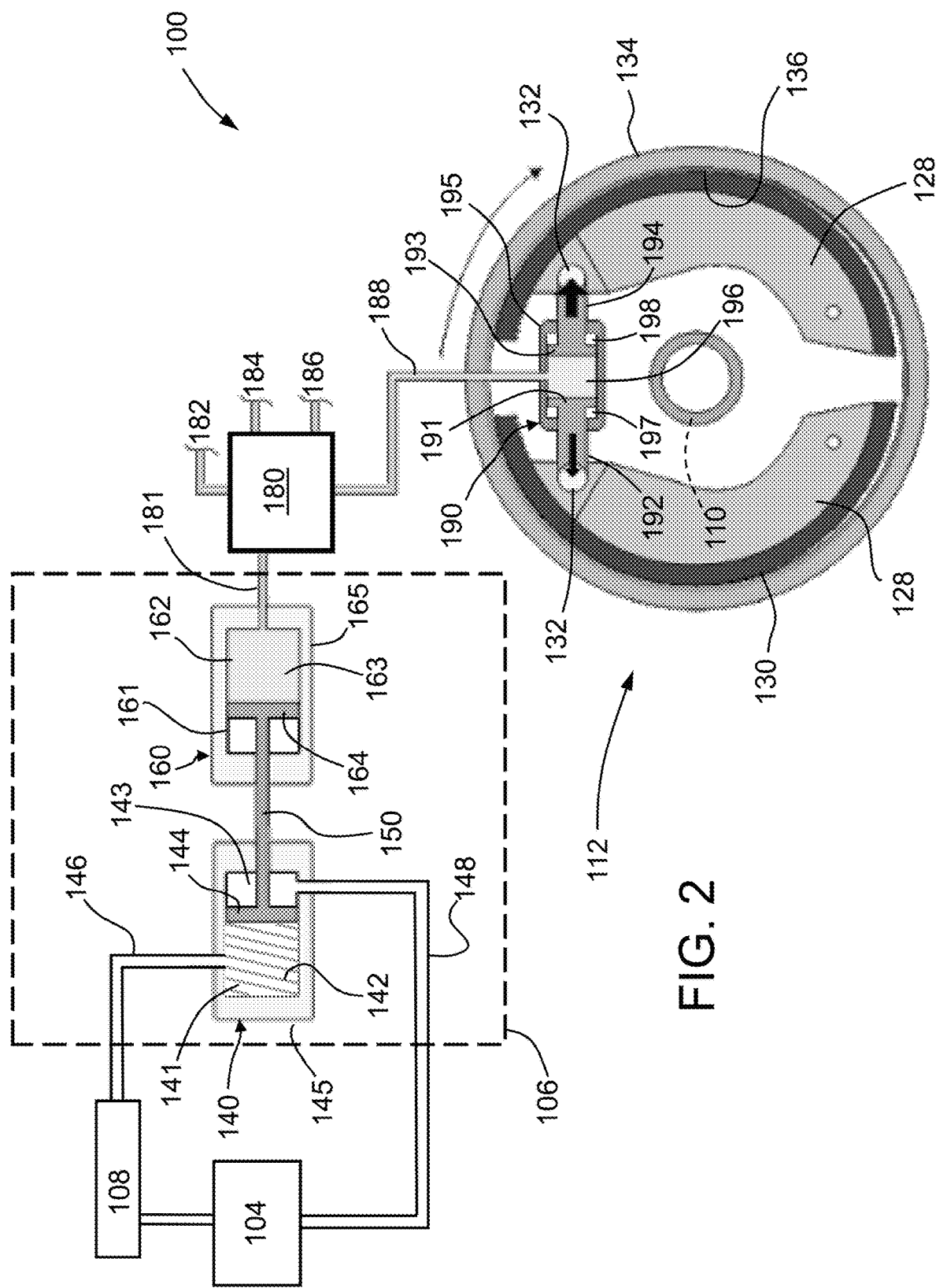
FIG. 2 represents certain components of a nonlimiting brake system that includes both air brake system elements and hydraulic brake system elements in accordance with certain nonlimiting aspects of the invention.

FIG. 2 represents certain aspects of certain nonlimiting components of the brake system 100 represented by FIG. 3. The brake system 100 includes an air actuator 140, a hydraulic actuator 160, an optional anti-lock brake system (ABS) 180, and a hydraulic slave actuator 190 located within the brake 112. The air actuator 140 and hydraulic actuator 160 are designated in FIG. 2 as components of the transfer unit 106, and serve to convert changes in air pressure supplied by the air circuit 104 to the air actuator 140 into changes in pressure of the hydraulic fluid within the hydraulic actuator 160, which supplies the hydraulic fluid to the hydraulic circuit 102 and brake 112. In FIG. 2, the transfer unit 106 is represented as receiving pressurized air from the air circuit 104 through an air line 146, and as delivering hydraulic fluid to the hydraulic circuit 102 (not labeled) through a hydraulic fluid line 181. With this nomenclature, the ABS 180, hydraulic slave actuator 190, and brake 112 may be considered as components of the hydraulic circuit 102.

It should be understood that the brake 112 is illustrated as a drum brake as an exemplary brake and therefore should not be considered to limit the scope of the invention. Brake systems within the scope of this disclosure may be used with other types of brakes, such as but not limited to disc brakes or wedge brakes. Notably, in certain embodiments the air actuator 140 and the hydraulic actuator 160 may be a single component.

The air actuator 140 includes a housing 145 (for example, a cylinder) having a cavity therein (for example, a bore) that is fluidically separated into first and second chambers 141 and 143 by a piston 144. The piston 144 is coupled within the second chamber 143 to a connector rod 150 that extends through the housing 145 and out of the cavity. A spring 142 (or other biasing member) is provided in the first chamber 141 that is configured to bias the piston 144 in a direction toward the second chamber 143. The air line 146 fluidically couples the air circuit 104 to the first chamber 141, and a second air line 148 fluidically couples the air circuit 104 to the second chamber 143. As such, the air circuit 104 is adapted to supply a gaseous fluid (hereinafter referred to as air for convenience) to each of the first and second chambers 141 and 143. However, the air supplied by the air circuit 104 to the first and second chambers 141 and 143 can be regulated to different pressures, and therefore the pressurized air supplied by the air circuit 104 to the first chamber 141 shall be referred to as control air, and the pressurized air supplied by the air circuit 104 to the second chamber 143 shall be referred to as supply air.

The hydraulic actuator 160 includes a housing 165 (for example, a cylinder) with a cavity therein (for example, a bore) that is fluidically separated into first and second chambers 161 and 163 by a piston 164. The connector rod 150 is directly or mechanically coupled to the piston 164 of the hydraulic actuator 160 such that movement of the piston 144 of the air actuator 140 causes movement of the piston 164 of the hydraulic actuator 160. The second chamber 163 of the hydraulic actuator 160 is filled with the hydraulic fluid 162 from the hydraulic circuit 102. In certain embodiments, the hydraulic actuator 160 may be a hydraulic master cylinder of a type known in the art.

The second chamber 163 of the hydraulic actuator 160 is fluidically or functionally coupled to the ABS 180 with the hydraulic fluid line 181. The ABS 180 is coupled to the hydraulic slave actuator 190 with a fluid line 188. Additional fluid lines 182, 184, and 186 may be provided to enable the ABS 180 to be fluidically connected to hydraulic slave actuators of other brakes (not shown) within the brake system 100. It should be understood that these fluid lines 182, 184, 186, and 188 are merely exemplary and the brake system 100 may include more or less fluid lines fluidically or functionally coupled with the ABS 180. For example, the hydraulic circuit 102 may include one or more fluid lines each coupled to one or more corresponding slave actuators at one or more of the brakes, may include one or more fluid lines each split to couple to multiple slave actuators at one or more of the brakes, or combinations thereof. Further, the brake system 100 may include more than one ABS 180, or the ABS 180 may include more than one control system associated with one or more portions of the hydraulic circuit 102 and/or one or more of the slave actuators 190. In certain embodiments, the ABS 180 may be located on a semi-trailer and provided with a local power source (for example, battery pack) such that the ABS 180 is capable of initiating a controlled stop of the semi-trailer in an emergency event, such as the semi-trailer becoming electrically, functionally, or physically, separated from a tractor while being pulled thereby. It should be noted that the hydraulic circuit 102 represented in FIGS. 2 and 3 is simplified for convenience of the present disclosure and may include various other components associated with or common to hydraulic systems, such as but not limited to valves (for example, for flow control), reservoirs (for example, for fluid storage), pumps, vents, additional fluid lines, sensors, etc.

The brake 112 is substantially similar in certain aspects to drum brakes known in the art and used with conventional air brake systems. Specifically, the brake 112 includes a drum 134 coupled to an axle 110, a drum liner 136 on an interior surface of the drum 134 that faces brake linings or pads 130 mounted on a pair of brake shoes 128. The brake shoes 128 are configured to be actuated to cause the brake pads 130 to come into and out of contact with the drum liner 136. Contact between the brake pads 130 and the drum liner 136 produces a braking force that is transferred to the axle 110 and thereby slows the speed of the vehicle 101.

As portrayed in the nonlimiting embodiment of FIG. 2, each brake shoe 128 of the brake 112 is functionally coupled to the hydraulic slave actuator 190 of the brake 112 shown. The slave actuator 190 includes a housing 195 (for example, a cylinder) with a cavity therein (for example, a bore) that is fluidically separated into first, second, and third chambers 196, 197, and 198 by a pair of oppositely-disposed first and second pistons 191 and 193. The first chamber 196 is located between the first and second pistons 191 and 193 contains hydraulic fluid supplied by the hydraulic circuit 102 through the fluid line 188. The first piston 191 is coupled to a connection rod 192 that extends through the second chamber 197 before exiting the housing 195. The second piston 193 is coupled to a connection rod 194 that extends through the third chamber 198 before exiting the housing 195 at the end of the housing 195 opposite the connection rod 192, such that the connection rods 192 and 194 extend in opposite directions from the housing 195. Each of the connection rods 192 and 194 are directly or mechanically coupled to a corresponding one of the brake shoes 128, for example, with rollers 132. In certain embodiments, the slave actuators 190 may be hydraulic brake or slave cylinders of a type known in the art.

Although not shown, the hydraulic circuit 102 may have multiple fluidically separate subcircuits that may be coupled to one or more slave actuators 190 associated with the brake 112. Such embodiments provide for redundancy and may promote safety in the event of failure of one of the sub circuits (for example, a hydraulic fluid leak). In addition, each of the brake shoes 128 may be functionally coupled with more than one slave actuator 190 such that the brake 112 may at least partially function in the event that a single slave actuator 190 fails. Though a minimum pressure in a single hydraulic circuit, either maintained by the ABS 180 or by the mechanical design of the system 100, can be utilized to provide automatic brake adjustment of the brake shoes 128, multiple slave actuators 190 could be used to assist with or exclusively perform this task. Furthermore, multiple slave actuators 190 could be used to hydraulically actuate the brake shoes 128 into and out of engagement with the drum liner 136 in a manner capable of providing faster or stronger release responses to the drum shoes 128. In addition, using slave actuators 190 to hydraulically disengage the brake pads 130 from the drum 134 could possibly address a condition that occurs where brakes lock themselves to their drums due to freezing weather and moisture inside the drums. This condition can happen if a trailer is parked and snow, ice, etc., collects within a drum, causing one or both of its brake shoes to freeze in a position in which the brake pads contact the drum. When the trailer is coupled to a tractor and air pressure is applied to the brakes, spring returns on conventional brake actuators may not be sufficient to turn the S-cam or the S-cam may not turn sufficiently to disengage the brake pads from the drum. As a result, the frozen brake prevents the associated wheel or axle from turning, and the operator may be required to try to release the brake by hitting the drum with a hammer in an effort to dislodge the ice. In this situation, the slave actuators 190 could be operated to apply a hydraulically-generated mechanical action that forcibly disengages the brake pads 130 from the drum 134.

In combination, the air actuator 140 and the hydraulic actuator 160 are configured to convert manual actuation of the brake pedal 108 (FIG. 3) connected to the air circuit 104 into a change in pressure of the hydraulic fluid within the hydraulic circuit 102. With the arrangement represented in FIG. 2, the air circuit 104 may be configured to control and supply air pressures within the first and second chambers 141 and 143 of the air actuator 140 based on a degree of actuation of the brake pedal 108. For example, when the air circuit 104 is inactive (for example, if either the vehicle 101 or the air circuit 104 is shut off or a parking brake of the vehicle 101 is engaged), the air pressure within the second chamber 143 is below a minimum threshold such that the position of the piston 144 is in a closed position due to the force applied thereto by the spring 142. With the piston 144 in the closed position, the piston 144 is located as far into the second chamber 143 as possible based on the size of the spring 142, the volume of the second chamber 143 of the hydraulic actuator 160 is at a minimum, and the hydraulic fluid within the hydraulic circuit 102 is at or approaching a maximum pressure.

Upon activating the air circuit 104 (for example, by starting the vehicle 101 or the air circuit 104 or by disengaging the parking brake), the air circuit 104 supplies the supply air to the second chamber 143 of the air actuator 140 through the air line 148 until the air pressure within the second chamber 143 is increased to an operating pressure. The operating pressure applies a force against the piston 144 sufficient to compress the spring 142 in the first chamber 141 and move the piston 144 toward the first chamber 141 to an open position. In the open position, the piston 144 is located as far into the first chamber 141 as possible based on a maximum compression of the spring 142 and/or to an extent sufficient such that the volume of the second chamber 143 of the hydraulic actuator 160 is at a maximum and the hydraulic fluid within the hydraulic circuit 102 is at or approaching a minimum pressure.

While the air circuit 104 is activated and the air within the second chamber 143 of the air actuator 140 is at an operating pressure, the air circuit 104 is configured to selectively supply the control air to the first chamber 141 of the air actuator 140 through the air line 146 in response to the brake pedal 108 being actuated. The supplying of the control air increases the air pressure within the first chamber 141 which applies a force against the piston 144 sufficient to move the piston 144 toward the second chamber 143 in a direction from the open position toward the closed position. The supply of control air and the corresponding increase in air pressure is in relation to and in some cases may be proportional to the degree of actuation of the brake pedal 108. If the actuation of the brake pedal 108 is reduced or released, the air circuit 104 is configured to reduce the air pressure within the first chamber 141, allowing the piston 144 to move toward the first chamber 141 in a direction from the closed position toward the open position due to the air pressure within the second chamber 143.

Since the piston 164 of the hydraulic actuator 160 moves in conjunction with the piston 144 of the air actuator 140 as a result of their physical connection with the connector rod 150, the air circuit 104, the air actuator 140, and the hydraulic actuator 160 may be used to selectively increase and/or decrease the volume of the second chamber 163 in the hydraulic actuator 160 and thereby increase and/or decrease the pressure of the hydraulic fluid within the hydraulic circuit 102 in relation to the degree of actuation of the brake pedal 108.

The hydraulic circuit 102 is configured to apply a braking force with the brake 112 that is in relation to a change in the volume of the second chamber 163 of the hydraulic actuator 160 and/or a change in the pressure of a hydraulic fluid within the hydraulic circuit 102. In particular, transferring the hydraulic fluid from the first chamber 196 of the slave actuator 190 to the second chamber 163 of the hydraulic actuator 160 causes the first and second pistons 191 and 193 to move toward one another into the first chamber 196. As a result, the connection rods 192 and 194 actuate the brake shoes 128 such that the force of the brake pads 130 against the drum liner 136 is reduced or, if the movement of the first and second pistons 191 and 193 is sufficient, the brake pads 130 disengage from the drum liner 136 entirely.

Similarly, transferring the hydraulic fluid from the second chamber 163 of the hydraulic actuator 160 to the first chamber 196 of the slave actuator 190 causes the first and second pistons 191 and 193 to move away from one another into the second and third chambers 197 and 198, respectively. As a result, the connection rods 192 and 194 actuate the brake shoes 128 such that the brake pads 130 may engage the drum liner 136 (if the movement of the first and second pistons 191 and 193 is sufficient), and once engaged the force of the brake pads 130 against the drum liner 136 may be increased.

Therefore, the braking force applied by the brake 112 may be controlled by the hydraulic circuit 102, and since the hydraulic circuit 102 may be controlled at least in part by the air circuit 104, the air actuator 140, and the hydraulic actuator 160, the braking force applied by the brake 112 may be controlled by the brake pedal 108 and the speed of the vehicle 101 may be reduced by actuation thereof. Preferably, when the piston 144 of the air actuator 140 is in the closed position the brake 112 is fully engaged via the hydraulic circuit 102 and applies a maximum braking force. In contrast, when the piston 144 of the air actuator 140 is in the open position the brake 112 is fully disengaged via the hydraulic circuit 102 and applies no braking force.

In certain embodiments, movement of the piston 144 of the air actuator 140 may cause the brake 112 to engage and apply a braking force equal to or less than the maximum braking force that is in relation to the degree of actuation of the brake pedal 108. For example, a fully compressed (for example, pressed down) brake pedal 108 may cause a maximum braking force and a released brake pedal 108 may cause no braking force or a minimum braking force. Optionally, the brake system 100 may include the ABS 180 as described previously which may in certain situations modify the relationship between the actuation of the brake pedal 108 and the braking force provided by the brake 112.

The ABS 180 is configured to modulate the braking force applied by any or all brakes 112 of the vehicle 101 in certain situations to reduce the likelihood that the tires associated with the brakes 112 will lock. In the embodiment of FIG. 2, the ABS 180 may modulate the braking force by selectively modulating (for example, decreasing or increasing) the pressure of the hydraulic fluid at least within portions of the hydraulic circuit 102 associated with one or more of the slave actuators 190. For example, the ABS 180 may be configured to reduce the pressure of the hydraulic fluid in one or more of the fluid lines 182, 184, 186, and 188 to reduce the likelihood of one or more tires associated with the brakes 112 from locking. Alternatively, the ABS 180 may be configured to modulate the pressure of the hydraulic fluid in the entire hydraulic circuit 102.

The ABS 180 may be various types known in the art for use with hydraulic fluid systems. For example, the ABS 180 may include components such as one or more control processors, data storage media, valves, sensors, actuators, pumps, fluid lines, associated circuitry, and any other components necessary or desired to control the operation of the brakes of the vehicle 101, such as the drum brake 112. Sensors (not shown) may be provided that are configured to measure a rotational speed of each of the wheels of the vehicle 101 and provide data feedback to the ABS 180 associated with such measurements. In addition to reducing the likelihood of tire lock, the ABS 180 may be configured to perform selective braking with one or more of the brakes on a side of the vehicle 101 or a trailer coupled thereto. This capability may be used to establish yaw forces on the vehicle 101 or a trailer coupled to the vehicle 101, which may promote stability thereof.

In view of the above, methods of operating brake systems and vehicles having the same installed thereon to reduce the speed of the vehicle 101 with one or more brakes 112 may include the steps of manually actuating a brake pedal 108 of the vehicle 101, converting the degree of actuation of the brake pedal 108 to an air pressure change within the pressurized air circuit 104 of the vehicle 101, converting the air pressure change into a change in pressure of a hydraulic fluid within the hydraulic circuit 102 of the vehicle 101, and applying a braking force with the one or more brakes 112 as a result of the pressure change in the hydraulic fluid.

The methods may be performed with the brake system 100 described previously by initiating the air circuit 104 to increase the air pressure within the second chamber 143 of the air actuator 140 to the operating pressure such that a force is applied against the piston 144 sufficient to compress the spring 142 and move the piston 144 in a direction from the closed position to the open position thereof prior to manually actuating a brake pedal 108 of the vehicle 101.

Once the operating pressure has been achieved in the second chamber 143, the brake pedal 108 may be compressed to increase the air pressure within the first chamber 141, move the piston 144 toward the second chamber 143 in a direction from the open position toward the closed position thereof, decrease the volume of the second chamber 163 of the hydraulic actuator 160 and/or increase the pressure of the hydraulic fluid within the hydraulic circuit 102, and thereby apply a braking force with the brakes 112. Similarly, the brake pedal 108 may be decompressed or released to decrease the air pressure within the first chamber 141, move the piston 144 toward the first chamber 141 in a direction from the closed position toward the open position thereof, increase the volume of the second chamber 163 of the hydraulic actuator 160 and/or decrease the pressure of the hydraulic fluid within the hydraulic circuit 102, and thereby reduce or cease a braking force with the brakes 112.

The braking force in response to actuation of the brake pedal 108 may directly apply a braking force wherein movement of the piston 144 toward the second chamber 143 in a direction from the open position toward the closed position thereof causes an increase in braking force, and movement of the piston 144 toward the first chamber 141 in a direction from the closed position toward the open position thereof causes a decrease in braking force. Optionally, the method may include modulating the braking force by selectively modulating (for example, decreasing or increasing) the pressure of the hydraulic fluid within portions of or the entirety of the hydraulic circuit 102, for example, with the ABS 180.

In addition to the above, the brake system 100 is capable of being used with a parking brake (not shown) that is configured to control the air pressure within the second chamber 143 of the air actuator 140. Interaction with such a parking brake provides the capability of selectively adjusting the air pressure within the second chamber 143 from below the minimum air pressure to the operating pressure. Beneficially, the brake system 100 is configured such that, in the event of failure of the air circuit 104 (for example, a supply air leak) and a reduction of the air pressure in the second chamber 143 of the air actuator 140, the potential force of the spring 142 ensures that the brakes 112 engage. This functionality provides essentially similar safety benefits as compared to certain conventional air brake systems.

Certain existing vehicles having air pressure brake systems may be modified to use a brake system as disclosed herein. For example, in the event that the vehicle 101 was equipped with a pressurized air system configured for actuating its brakes 112 in response to actuation of its brake pedal 108, the vehicle 101 may be modified by installing a hydraulic circuit 102 on the vehicle 101 functionally between the pressurized air circuit 104 and the brakes 112. The hydraulic circuit 102 is preferably configured to actuate the brakes 112 and apply a braking force therewith in response to a change in a pressure of the hydraulic fluid within the hydraulic circuit 102. The pressurized air circuit 104 may be modified such that the air circuit 104 is configured to convert actuation of the brake pedal 108 to a change in the pressure of the hydraulic fluid within the hydraulic circuit 102 and thereby apply a braking force in relation to the degree of actuation of the brake pedal 108.

Such modifications may include removing various components of the vehicle 101, such as those associated with the air circuit 104 and/or brakes 112. As a nonlimiting example, in the event that the vehicle 101 was equipped with drum brakes 112, the vehicle 101 may be modified by removing one or more S-cams, one or more service or spring chambers, and mechanical linkage therebetween (for example, as shown in FIG. 1). The air actuator 140 may be installed on the vehicle 101 and the air circuit 104 may be fluidically coupled to the air actuator 140 such that the air circuit 104 is configured to control air pressures within the first and second chambers 141 and 143 thereof based on a degree of actuation of the brake pedal 108, for example, by coupling supply air to the air line 148 and control air to the air line 146. The hydraulic actuator 160 may be installed such that it is functionally coupled with the connector rod 150 of the air actuator 140. One or more hydraulic slave actuators 190 may be installed on each of the brakes 112 and functionally coupled to the hydraulic actuator 160 such that the actuation of the slave actuators 190 actuates the brake shoes 128 of the brakes 112. Optionally, the ABS 180 may be installed functionally between the hydraulic actuator 160 and each of the hydraulic slave actuators 190 and programmed such that the ABS 180 may modulate actuation of the brakes 112 and thereby reduce the likelihood of tire lock.

Modifications of the types mentioned above may have various benefits. For example, elimination of the mechanical linkage may reduce the necessity of adjustment of conventional air driven actuators and may promote more consistent braking. Other benefits may include automatic compensation for vehicle or trailer load to prevent or reduce the likelihood of tire lock, reduced overall weight due to removal of air brake system components, inclusion of current safety responses to air system failures, the addition of multiple or different layers of redundancy, and anti-lock braking control with response times typical of a hydraulic system. Such modification methods provide for retrofitting of existing vehicles and trailers without altering many of the existing components, such as connections for power and compressed air, or the brakes themselves.

With regards specifically to semi-tractor trailers, brake systems and methods disclosed herein provide the capability to maintain the universal compatibility of the connection between a semi-trailer and a tractor while eliminating certain shortcomings of the existing air brake systems by converting the braking signal medium from pressurized air to a hydraulic fluid. Such modification allows for more precise application or removal of braking forces allowing a full braking capacity of the tires to be utilized, regardless of load. A secondary benefit for these systems and methods is a weight reduction for the semi-trailer due to the removal of certain air brake system components which may include one or more accumulation tanks.

It is also believed that brake systems and methods disclosed herein provide a step toward electrification of semi-tractor tractors, and elimination of pressurized air systems for use in semi-trailer braking actuation entirely. For example, instead of using a pressurized air signal to relieve the potential energy locking the brakes, an electrical signal could provide the same information.

While the invention has been described in terms of specific or particular embodiments, it should be apparent that alternatives could be adopted by one skilled in the art. For example, the brake system 100 and its components could differ in appearance and construction from the embodiments described herein and shown in the figures, functions of certain components of the brake system 100 could be performed by components of different construction but capable of a similar (though not necessarily equivalent) function, and various materials could be used in the fabrication of the brake system 100 and/or its components. Accordingly, it should be understood that the invention is not necessarily limited to any embodiment described herein. It should also be understood that the phraseology and terminology employed above are for the purpose of describing the disclosed embodiments, and do not necessarily serve as limitations to the scope of the invention. Therefore, the scope of the invention is to be limited only by the claims.

The invention claimed is:

1. A brake system for operating one or more brakes of a vehicle that are configured to reduce the speed of the vehicle, the vehicle including a brake pedal for controlling the one or more brakes, the brake system comprising:
a hydraulic circuit functionally coupled to the one or more brakes and configured to apply a braking force with the brakes that is in relation to a change in a pressure of a hydraulic fluid within the hydraulic circuit, the hydraulic circuit comprising a hydraulic actuator having a hydraulic actuator housing, a hydraulic actuator cavity within the hydraulic actuator housing, a hydraulic actuator piston that fluidically separates the hydraulic actuator cavity into first and second hydraulic chambers, and a connector rod coupled to the hydraulic actuator piston, the second hydraulic chamber containing a portion of the hydraulic fluid of the hydraulic circuit and movement of the hydraulic actuator piston is operable to increase and decrease the pressure of the hydraulic fluid of the hydraulic circuit;
a pressurized air circuit supplying a pressurized supply air, the pressurized air circuit functionally coupling the brake pedal to the hydraulic circuit, the air circuit configured to convert manual actuation of the brake pedal to a change in the pressure of the hydraulic fluid within the hydraulic circuit and thereby apply a braking force in relation to a degree of actuation of the brake pedal, the air circuit comprising an air actuator having an air actuator housing, an air actuator cavity within the air actuator housing, and an air actuator piston that fluidically separates the air actuator cavity into first and second air chambers, the air actuator piston being coupled to the connector rod such that movement of the air actuator piston causes movement of the hydraulic actuator piston to functionally couple the air actuator to the hydraulic circuit;
a supply air line supplying the pressurized supply air from the air circuit to the second air chamber; and
a control air line supplying pressurized control air to the first air chamber, the pressurized control air being the pressurized supply air from the air circuit regulated with the brake pedal, the pressurized control air supplied to the first air chamber being reduced by the brake pedal to be at a different pressure than the pressurized supply air supplied to the second air chamber;
wherein the air circuit regulates the pressurized control air based on a degree of actuation of the brake pedal to actuate the air actuator piston and thereby actuate the hydraulic actuator piston through the connector rod to increase and decrease the pressure of the hydraulic fluid of the hydraulic circuit.

2. The brake system of claim 1, further comprising:
a spring disposed in the first air chamber and configured to apply a force against the air actuator piston in a direction toward the second air chamber.

3. The brake system of claim 2, wherein when the air circuit is inactive, air pressure of the pressurized supply air within the second air chamber of the air actuator is below a minimum threshold such that the position of the air actuator piston is in a closed position due to the force applied thereto by the spring, wherein when the air actuator piston is in the closed position the brakes are fully engaged via the hydraulic circuit and apply a maximum braking force.

4. The brake system of claim 3, wherein upon activating the air circuit, the air pressure of the pressurized supply air within the second air chamber of the air actuator is increased to an operating pressure that applies a force against the air actuator piston sufficient to compress the spring in the first air chamber and move the air actuator piston toward the first air chamber to an open position, wherein when the air actuator piston is in the open position the brakes are fully disengaged via the hydraulic circuit and apply no braking force.

5. The brake system of claim 1, wherein while the air circuit is active, the air circuit is configured to increase air pressure of the pressurized control air within the first air chamber of the air actuator in response to the brake pedal being articulated, the increase in the air pressure within the first air chamber applying a force against the air actuator piston sufficient to move the air actuator piston toward the second air chamber from the open position toward the closed position, movement of the air actuator piston causing the brakes to engage and apply a braking force equal to or less than the maximum braking force that is in relation to the degree of actuation of the brake pedal.

6. The brake system of claim 1, wherein the hydraulic actuator is configured to hydraulically control one or more hydraulic slave actuators each associated with a corresponding one of the one or more brakes, wherein transferring the hydraulic fluid of the hydraulic circuit from the hydraulic slave actuators to the hydraulic actuator causes the brakes to release and transferring the hydraulic fluid from the hydraulic actuator to the hydraulic slave actuators causes the brakes to engage and reduce the speed of the vehicle.

\* \* \* \* \*